3,485,147
ADHESIVE TUBE AND DISPENSER
James A. Hurst, Harvard, Mass.
(601 E. Brow Road, Lookout Mountain, Tenn. 37350)
Filed Nov. 17, 1967, Ser. No. 683,883
Int. Cl. B31c 3/00
U.S. Cl. 93—80    5 Claims

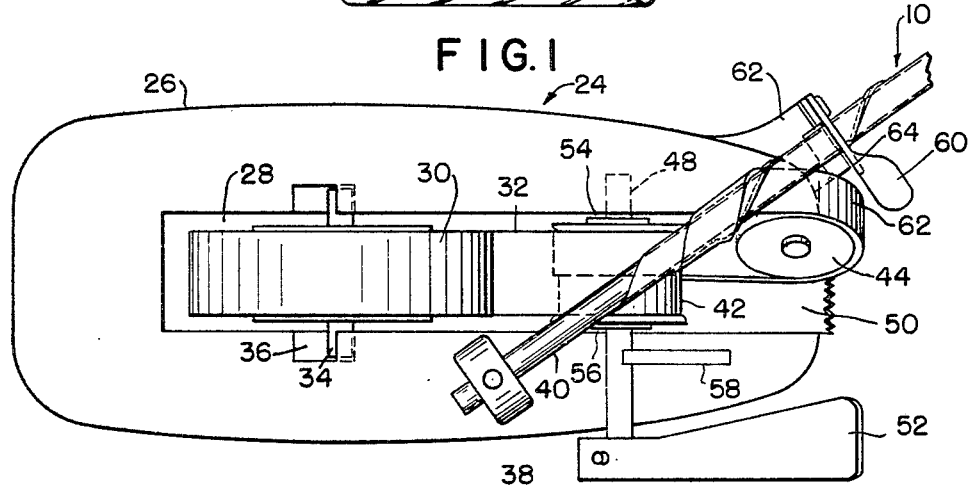
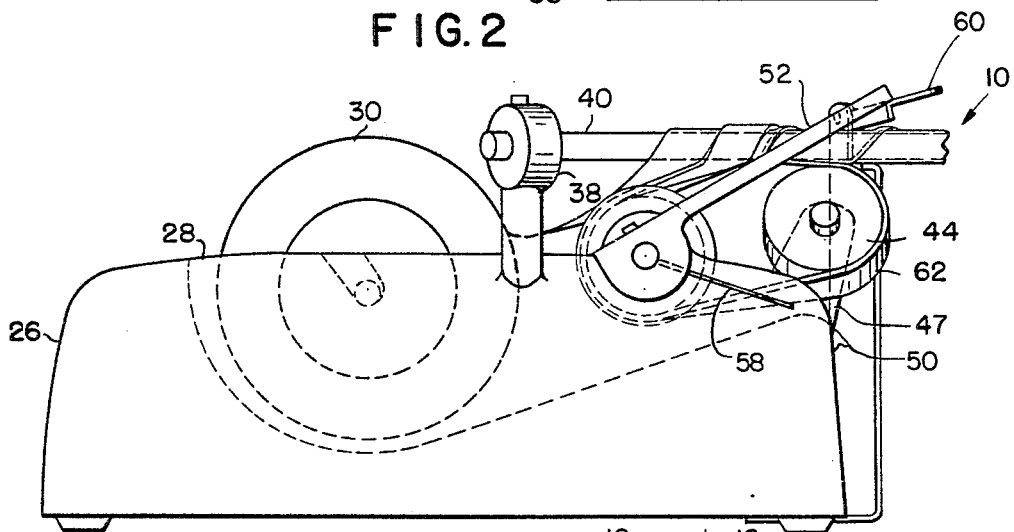
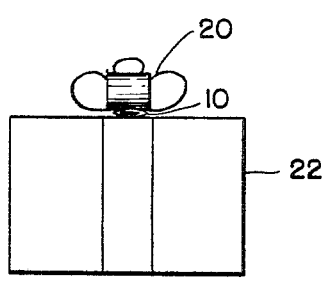
Dec. 23, 1969  J. A. HURST  3,485,147
ADHESIVE TUBE AND DISPENSER
Filed Nov. 17, 1967
INVENTOR.
JAMES A. HURST
BY Morse, Altman & Oates
ATTORNEYS United States Patent Office 3,485,147
Patented Dec. 23, 1969

ABSTRACT OF THE DISCLOSURE

Apparatus is provided for forming tubes of any desired length from a supply of pressure sensitive adhesive tape. The tube is formed with the adhesive surface facing outwardly whereby sections on the tube may be employed for a variety of uses such as joining, packaging, mounting pictures, and the like. The tube forming apparatus is organized about a fixed mandrel extending diagonally across the discharge end of an adhesive tape dispenser. The tape is fed from the roll and wrapped in overlapping helical turns about the mandrel. The overlapping of adjacent convolutions converts the tape into a tube which is semi-rigid and which may be drawn off in any length by manually pulling and twisting the end of the tube from the mandrel or by means of an automatic feed mechanism.

BACKGROUND OF THE INVENTION

Field of the invention

This invention relates generally to pressure sensitive adhesive products and the apparatus for making same, and more particularly is directed towards a pressure sensitive adhesive tubing and a simple mechanical apparatus for dispensing the tubing.

Description of the prior art

Pressure sensitive adhesive tape is used for a wide variety of applications such as joining, mending, mounting and the like. Most pressure sensitive adhesive tapes are in the form of a transparent film having a coating of pressure sensitive adhesive on one side thereof. This type of tape requires that the tape be exposed when it is used to attach one object to another such as a photograph to a page, a notice on a bulletin board, or the like. Double-faced adhesive tapes are available in which the tape is coated on both sides with pressure sensitive adhesive. Such double-faced adhesive tape, while it may serve to mount objects to one another without being visible, has certain limitations in that irregular surfaces on the objects may reduce the surface-to-surface contact area with the tape and, also, the two types of pressure sensitive adhesive tape must be kept on hand if single surface adhesive tape is needed for conventional uses. It is therefore an object of the present invention to provide a tube, the outer surface of which is coated with a pressure sensitive adhesive coating, which tube is semi-rigid and yet is readily deformed to conform to irregular surfaces without impairing the surface-to-surface contact between objects. Another object of this invention is to provide a tube dispensing apparatus which employs conventional pressure sensitive adhesive tape coated on one side only whereby normal strips of single coated pressure sensitive adhesive tape may be dispensed or a tube of any length of exteriorly coated pressure sensitive adhesive tubing may be formed for applications generally equivalent to two-faced adhesive tape.

SUMMARY OF THE INVENTION

The present invention features a tube formed from pressure sensitive adhesive tape in which the adhesive surface is on the exterior of the tube. The tube may be employed for a wide variety of uses such as joining objects to one another. The tube flattens under radial pressure whereby two flat objects may be mounted in substantially flush, face-to-face relation. The tubing accommodates itself to irregularities in opposing surfaces whereby a good adhesive contact is assured even between irregular objects. This invention also features a simple adhesive tube dispensing apparatus comprising a mandrel mounted in fixed position diagonally across the discharge end of an adhesive tape dispenser. The tape is fed from the dispenser, wrapped around in overlapping helical turns about the mandrel and, as the tape is fed about the mandrel, a tube forms automatically to any desired length.

BRIEF DESCRIPTION OF THE DRAWINGS

FIG. 1 is a view in perspective of a section of an adhesive tubing made according to the invention, FIG. 2 is a top plan view of a tube forming and dispensing apparatus made according to the invention, FIG. 3 is a view in side elevation thereof, and, FIGS. 4 and 5 are views of typical uses for the adhesive tubing.

DESCRIPTION OF THE PREFERRED EMBODIMENT

Referring now to the drawings and to FIG. 1 in particular there is illustrated a length of adhesive tubing 10 made according to the invention. The tube is formed from pressure sensitive adhesive tape which has been wrapped helically into adjacent overlapping convolutions 12. As shown in FIG. 1, adjacent convolutions overlap to a slight extent along their margins indicated in 14. The tape is wrapped with the pressure sensitive adhesive surface on the outside of the tubing 10 so that the entire outer surface of the tubing will be covered with a pressure sensitive adhesive coating. By overlapping the tape in this fashion as it is formed helically, the pressure sensitive adhesive automatically joins adjacent convolutions so that the tubing 10 retains its shape and is a generally self-supporting product.

The adhesive covered tubing has a wide variety of uses, two typical uses being illustrated in FIGS. 4 and 5. In FIG. 4 a section of the pressure sensitive adhesive tubing 10 is employed to mount a picture 16 to a wall 18, the tubing being sandwiched between the face of the wall and the rear of the picture. In practice, the tubing is cut to length, pressed lightly onto the rear of the picture, and the picture is pressed flat against the wall. The tubing will flatten so that one side of the tubing will adhere to the wall while the other side will adhere to the picture, the tubular construction permits the product to conform to irregular surfaces while still maintaining a good adhesive contact between objects. In FIG. 5 a section of tubing is employed to fasten a bow 20, or any other decoration, to a package 22. The tubing is employed in the same manner as in FIG. 4, being sandwiched between the bow and the box by merely cutting a short section and locating it in the proper position. The tubing may obviously be employed for a wide number of other uses, both functional and decorative, such as mounting photographs, posting notices on bulletin boards, packaging and the like.

Referring now to FIGS. 2 and 3, there is illustrated an apparatus for forming and dispensing pressure sensitive adhesive tubes 10 of any desired length. The dispenser 24 is generally organized about a base 26 similar to a conventional desk type dispenser. The base 26 is formed with a recess 28 in its upper surface to accommodate a roll 30 of pressure sensitive adhesive tape 32, the roll typically having hubs 34 seated in sockets 36. Mounted to the base by means of an upright post 38 on one side of the base 24 and extending diagonally across the upper discharge end of the dispenser, is a mandrel 40. In the preferred mode the mandrel 40 is in the form of a solid cylindrical rod extending across the path of the tape as it is fed from the roll 30. The mandrel 40 serves as the forming element for producing the pressure sensitive adhesive tubing 10 of FIG. 1 and has a diameter corresponding to the desired inside diameter of the tubing 10 with a length sufficient for the tape 32 to make several convolutions, as suggested in FIG. 2. The tape 32 is wrapped helically about the mandrel 40 in overlapping turns with the adhesive coating facing outwardly. The angle of inclination of the mandrel to the path of the tape depends upon the relation of the diameter of the mandrel to the tape width. The angle must be such that the leading edge of the tape coming from the roll will overlap, slightly, the trailing edge of the tape which has already started to wind about the mandrel.

In the illustrated embodiment, a feed mechanism is provided for dispensing the tube 10 from the mandrel. The mechanism includes a pair of pulleys 42 and 44 with pulley 44 rotatably mounted to the base by means of a standard 46 tilted at a slight angle, while pulley 42 is mounted within the recess 28 on a shaft 48. A continuous belt 50 is looped over both pulleys and is wrapped one full turn helically about the mandrel 10. The belt 50 preferably is of a flexible material which does not adhere too strongly to the pressure sensitive adhesive tape. It will be understood that the belt 50 serves to drive the tape about the mandrel and to feed the tube 10 off the end of the mandrel in a simultaneous forming and dispensing action.

The pulleys and belts are driven by means of a finger actuated lever arm 52 fixed to the end of the shaft 48 on one side of the dispenser. The shaft 48 engages a pair rachet wheels 54 and 56 on either side of the pulley 42. A leaf spring 58 extends out from the shaft 48 and serves to return the lever arm 52 to a normally raised position after it is depressed. It will be understood that each time the arm 52 is depressed, the rachet wheels 54 and 56 will engage the pulley 52 causing it to drive the belt around the mandrel with the tape 52 sandwiched between the mandrel and the belt. As the belt advances helically about the mandrel, it will pull fresh tape onto the mandrel to form the tubing 10 and will simultaneously dispense the formed tubing from the end of the mandrel. Each stroke of the lever will form and advance a section of tubing and when the lever is released it will raise up. The rachet wheels will release the pulley 42 so that it remains stationary. The lever may be repeatedly actuated to form a tubing of any desired length. When the tubing is formed to its desired length, a finger actuated cut-off knife 60 is depressed. The knife 60 is spring-loaded and pivoted about a boss 62 on the side of the base 24 near the end of the mandrel 40. The knife is in a normally raised position and by depressing the flat end of the knife its cutting edge will cooperate with a fixed edge 64 below the mandrel to shear the end of the tubing.

While the feed mechanism has been shown in conjunction with the hand-operated lever, it will be understood that the pulley and belt may also be operated by means of a motor actuated by a suitable switching arrangement. Alternatively, the belt and pulleys may be eliminated and the tubing 10 formed by manually wrapping the tape about the mandrel. Once the tubing is started it is merely grasped at the end of the mandrel and may be continuously formed by imparting a twisting and pulling motion to the tubing to withdraw it from the mandrel in the finished form.

A conventional serrated cutting edge may be located in the path of the tape so that sections of tape may be removed and cut as in a conventional dispenser.

Having thus described the invention, what I claim and desire to obtain by Letters Patent of the United States is:

1. Apparatus for converting into a tube a pressure sensitive adhesive tape drawn from a roll comprising
   (a) a support,
   (b) means mounting a roll of pressure sensitive adhesive tape to said support,
   (c) means operatively associated with said support for drawing said tape from said roll, and
   (d) a mandrel mounted to said support and extending diagonally across the path of said tape as it is drawn from said roll whereby said tape is wrapped adhesive side out in helical overlapping turns about said mandrel and is drawn off the end thereof in a tube.

2. Apparatus according to claim 1 including tape feed means for advancing said tape onto and along said mandrel.

3. Apparatus according to claim 1 including tube cutting means mounted to said support for cutting said tube to a desired length.

4. Apparatus according to claim 2 wherein said tape feed means includes a plurality of pulleys rotatably mounted to said support, a continuous belt looped about said pulleys and helically about said mandrel, and driving means for rotating at least one of said pulleys to advance said belt.

5. Apparatus according to claim 4 wherein said driving means includes a spring-loaded lever and a ratchet drivingly connected to at least one of said pulleys.

References Cited

UNITED STATES PATENTS

| | | | |
|---|---|---|---|
| 3,081,213 | 3/1963 | Chinn | 93—80 X |
| 3,108,516 | 10/1963 | Elam | 93—80 |
| 3,124,497 | 3/1964 | Sydanmaa | 93—36.9 X |
| 3,165,034 | 1/1965 | Cvacho | 93—80 |
| 3,402,646 | 9/1968 | Hall | 93—79 |

OTHER REFERENCES

Pike (Abstract), Ser. No. 153,696, filed Apr. 3, 1950, published Sept. 23, 1952.

WAYNE A. MORSE, JR., Primary Examiner

U.S. Cl. X.R.

93—36.01, 36.9, 94